(12) United States Patent
Peng et al.

(10) Patent No.: US 10,346,496 B2
(45) Date of Patent: Jul. 9, 2019

(54) INFORMATION CATEGORY OBTAINING METHOD AND APPARATUS

(71) Applicant: TENCENT TECHNOLOGY (SHENZHEN) COMPANY LIMITED, Shenzhen (CN)

(72) Inventors: Zuojie Peng, Shenzhen (CN); Jianle Tang, Shenzhen (CN); Yu Huang, Shenzhen (CN); Wei Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 178 days.

(21) Appl. No.: 15/335,682

(22) Filed: Oct. 27, 2016

(65) Prior Publication Data
US 2017/0046447 A1    Feb. 16, 2017

Related U.S. Application Data

(63) Continuation of application No. PCT/CN2015/080933, filed on Jun. 5, 2015.

(30) Foreign Application Priority Data

Jun. 6, 2014    (CN) .......................... 2014 1 0248127

(51) Int. Cl.
   *G06F 16/90*   (2019.01)
   *G06F 16/954*  (2019.01)
   (Continued)

(52) U.S. Cl.
   CPC .......... *G06F 16/954* (2019.01); *G06F 16/285* (2019.01); *G06F 16/9535* (2019.01)

(58) Field of Classification Search
   CPC ......... G06F 17/30873; G06F 17/30598; G06F 17/30867; G06F 16/954; G06F 16/285; G06F 16/9535
   See application file for complete search history.

(56) References Cited

U.S. PATENT DOCUMENTS 5,418,948 A * 5/1995 Turtle ............... G06F 17/30011
                                                     707/700
5,754,939 A * 5/1998 Herz .................... G06Q 20/383
                                                     348/E7.056

(Continued)

FOREIGN PATENT DOCUMENTS

CN    101071424 A    11/2007
CN    101079063 A    11/2007

(Continued)

OTHER PUBLICATIONS

English translation from IDS Chinese patent CN10770520, 6 pages (Year: 2010).*

(Continued)

*Primary Examiner* — Kris E Mackes
*Assistant Examiner* — Tiffany Thuy Bui
(74) *Attorney, Agent, or Firm* — Marshall, Gerstein & Borun LLP

(57) ABSTRACT

The present disclosure discloses an information category acquiring method and apparatus. The method includes: acquiring a browse record about a user browsing a Web page, the browse record including at least a Web page identifier of the Web page that the user browses; acquiring interestingness of the user for information categories according to the browse record; and acquiring an information category for which interestingness meets a first preset condition, and using the acquired information category as an information category in which the user is interested.

7 Claims, 5 Drawing Sheets

(51) Int. Cl.
*G06F 16/28* (2019.01)
*G06F 16/9535* (2019.01)

(56) References Cited

U.S. PATENT DOCUMENTS

| | | | | |
|---|---|---|---|---|
| 5,835,905 | A * | 11/1998 | Pirolli | G06F 17/30663 |
| 7,287,064 | B1 * | 10/2007 | Haldar | G06F 17/30867 |
| | | | | 709/203 |
| 7,788,274 | B1 * | 8/2010 | Ionescu | G06F 17/30873 |
| | | | | 707/763 |
| 8,271,878 | B2 * | 9/2012 | Kane | G06Q 30/02 |
| | | | | 715/733 |
| 2003/0046311 | A1 * | 3/2003 | Baidya | G06F 17/30873 |
| 2006/0277455 | A1 * | 12/2006 | Yamada | G06F 17/30867 |
| | | | | 715/206 |
| 2008/0214157 | A1 * | 9/2008 | Ramer | G06F 17/30749 |
| | | | | 455/414.1 |
| 2010/0005088 | A1 * | 1/2010 | Zhang | G06F 17/30864 |
| | | | | 707/E17.108 |
| 2010/0169343 | A1 * | 7/2010 | Kenedy | G06F 17/30867 |
| | | | | 707/758 |
| 2012/0005573 | A1 | 1/2012 | Bao et al. | |
| 2012/0232951 | A1 * | 9/2012 | Su | G06Q 30/02 |
| | | | | 705/7.29 |
| 2012/0297011 | A1 | 11/2012 | Yu et al. | |
| 2013/0204860 | A1 * | 8/2013 | Gabara | G06F 17/30867 |
| | | | | 707/710 |
| 2014/0019460 | A1 | 1/2014 | Sambrani et al. | |
| 2014/0250356 | A1 * | 9/2014 | He | G06F 17/277 |
| | | | | 715/205 |
| 2015/0221301 | A1 * | 8/2015 | Zhang | G10L 15/26 |
| | | | | 704/246 |
| 2016/0307223 | A1 * | 10/2016 | Garcia Gomez | G06Q 30/0201 |

FOREIGN PATENT DOCUMENTS

| | | |
|---|---|---|
| CN | 101770520 A | 7/2010 |
| CN | 101894157 A | 11/2010 |
| CN | 101923545 A | 12/2010 |
| CN | 102314436 A | 1/2012 |
| CN | 102831246 A | 12/2012 |
| CN | 103678479 A | 3/2014 |
| WO | WO-2011/079443 A1 | 7/2011 |
| WO | WO-2012/006828 A1 | 1/2012 |

OTHER PUBLICATIONS

CN101079063A Translation, Tencent Technology, Nov. 28, 2007, 7 pages.*

Search Report in International Application No. PCT/CN2015/080933 dated Sep. 2, 2015, 2 pages.

International Preliminary Report on Patentability and Written Opinion in International Application No. PCT/CN2015/080933 dated Dec. 6, 2016, 4 pages.

Office Action from Chinese Application No. 201410248127.5 dated Nov. 26, 2018.

* cited by examiner

INFORMATION CATEGORY OBTAINING METHOD AND APPARATUS

CROSS-REFERENCE TO RELATED APPLICATIONS

This application is a continuation of International Application No. PCT/CN2015/080933, filed on Jun. 5, 2015. This application claims the benefit and priority of Chinese Patent Application No. 201410248127.5, filed Jun. 6, 2014. The entire disclosures of each of the above applications are incorporated herein by reference.

FIELD OF THE TECHNOLOGY

The present disclosure relates to the Internet field, and in particular, to an information category acquiring method and apparatus.

BACKGROUND OF THE DISCLOSURE

With development of an Internet technology, Internet information increases explosively. If users can be divided into groups according to interests of the users, and information corresponding to an information category in which users are interested can be recommended for the users in a same group, a click-through rate of the information can be greatly improved; for example, if an information category in which users in a group are interested is casual clothes, a server recommends commodity information of the casual clothes for the users in the group. Therefore, how to acquire an information category in which a user is interested appears to be particularly important.

Currently, an information category in which a user is interested is mainly acquired by using a search engine, including: acquiring keywords entered by the user into the search engine within a period of time, and for each keyword entered by the user, calculating a matching degree between this keyword entered by the user and each keyword in a correspondence between an information category and a keyword, selecting a keyword whose matching degree with this keyword entered by the user is the maximum, and increasing search times of an information category corresponding to the selected keyword by one; and acquiring a preset quantity of information categories whose search times are the maximum within this period of time, and using the acquired information categories as information categories in which the user is interested.

During implementation of the present disclosure, the inventor discovers that the existing technology has at least the following problems:

For most users, a frequency of using a search engine is low, and a quantity of keywords entered into the search engine within a period of time is not many, and is even less than a preset quantity, in this way causing accuracy of an information category in which a user is interested, which is obtained according to a keyword entered by the user, to be low.

SUMMARY

To solve a problem of the existing technology, the present disclosure provides an information category acquiring method and apparatus. The technical solutions are as follows:

According to one aspect, the present disclosure provides an information category acquiring method, the method including:
acquiring a browse record about a user browsing a Web page, the browse record including at least a Web page identifier of the Web page that the user browses;
acquiring interestingness of the user for information categories according to the browse record; and
acquiring an information category for which interestingness meets a first preset condition, and using the acquired information category as an information category in which the user is interested.

According to another aspect, the present disclosure provides an information category acquiring method, the method including:
acquiring a browse record about a user browsing a Web page, the browse record including at least a Web page identifier of the Web page that the user browses;
acquiring a first feature word set corresponding to the Web page according to the Web page identifier of the Web page that the user browses, the first feature word set corresponding to the Web page being used to store a feature word included in the Web page;
acquiring an information category to which the Web page belongs according to the first feature word set corresponding to the Web page and a correspondence between an information category and a second feature word set;
counting Web page quantities included in information categories;
separately determining the Web page quantities included in the information categories as interestingness of the user for the information categories; and
acquiring an information category for which interestingness meets a second preset condition, and using the acquired information category as an information category in which the user is interested.

According to another aspect, the present disclosure provides an information category acquiring apparatus, the apparatus including:
a first acquiring module, configured to acquire a browse record about a user browsing a Web page, the browse record including at least a Web page identifier of the Web page that the user browses;
a second acquiring module, configured to acquire interestingness of the user for information categories according to the browse record; and
a third acquiring module, configured to acquire an information category for which interestingness meets a first preset condition, and use the acquired information category as an information category in which the user is interested.

According to another aspect, the present disclosure provides an information category acquiring apparatus, the apparatus including:
a fourth acquiring module, configured to acquire a browse record about a user browsing a Web page, the browse record including at least a Web page identifier of the Web page that the user browses;
a fifth acquiring module, configured to acquire a first feature word set corresponding to the Web page according to the Web page identifier of the Web page that the user browses, the first feature word set corresponding to the Web page being used to store a feature word included in the Web page;
a sixth acquiring module, configured to acquire an information category to which the Web page belongs according to the first feature word set corresponding to the Web page and a correspondence between an information category and a second feature word set;

a counting module, configured to count Web page quantities included in information categories;

a determining module, configured to separately determine the Web page quantities included in the information categories as the interestingness of the user for the information categories; and a seventh acquiring module, configured to acquire an information category for which interestingness meets a second preset condition, and use the acquired information category as an information category in which the user is interested.

In embodiments of the present invention, a server acquires interestingness of a user for information categories according to a browse record, acquires an information category for which interestingness meets a preset condition, and uses the acquired information category as an information category in which the user is interested, thereby being capable of improving accuracy for acquiring the information category in which the user is interested.

BRIEF DESCRIPTION OF THE DRAWINGS

To describe the technical solutions of the embodiments of the present invention more clearly, the following briefly introduces the accompanying drawings required for describing the embodiments. Apparently, the accompanying drawings in the following description show only some embodiments of the present invention, and a person of ordinary skill in the art may still derive other drawings from these accompanying drawings without creative efforts.

DESCRIPTION OF EMBODIMENTS

In order to make objectives, technical solutions and advantages of the present disclosure clearer, embodiments of the present invention are described in detail in the following with reference to accompanying drawings.

Embodiment 1

Figure 1:
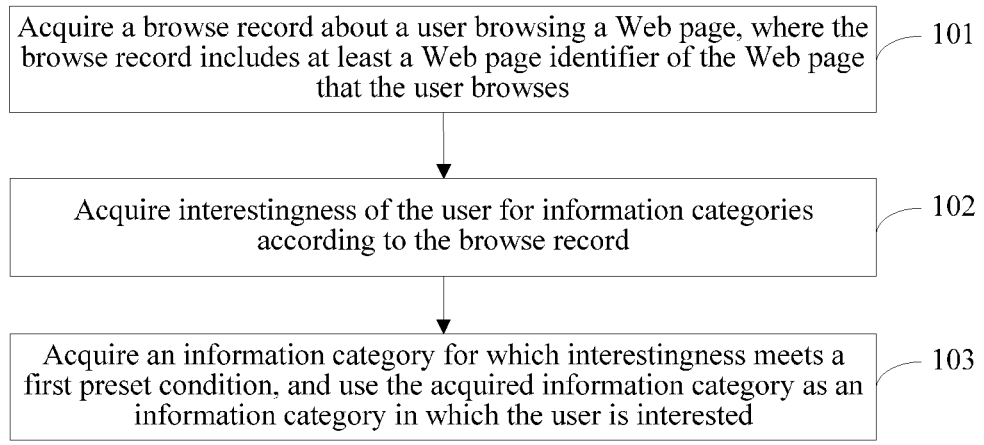
FIG. 1 is a flowchart of an information category acquiring method according to Embodiment 1 of the present invention.

This embodiment of the present invention provides an information category acquiring method. Referring to FIG. 1, the method includes:

Step S101: Acquire a browse record about a user browsing a Web page, where the browse record includes at least a Web page identifier of the Web page that the user browses.

Step S102: Acquire interestingness of the user for information categories according to the browse record.

Step S103: Acquire an information category for which interestingness meets a first preset condition, and use the acquired information category as an information category in which the user is interested.

In this embodiment of the present invention, a server acquires interestingness of a user for information categories according to a browse record, acquires an information category for which interestingness meets a first preset condition, and uses the acquired information category as an information category in which the user is interested, thereby being capable of improving accuracy for acquiring the information category in which the user is interested.

Embodiment 2

Figure 2:
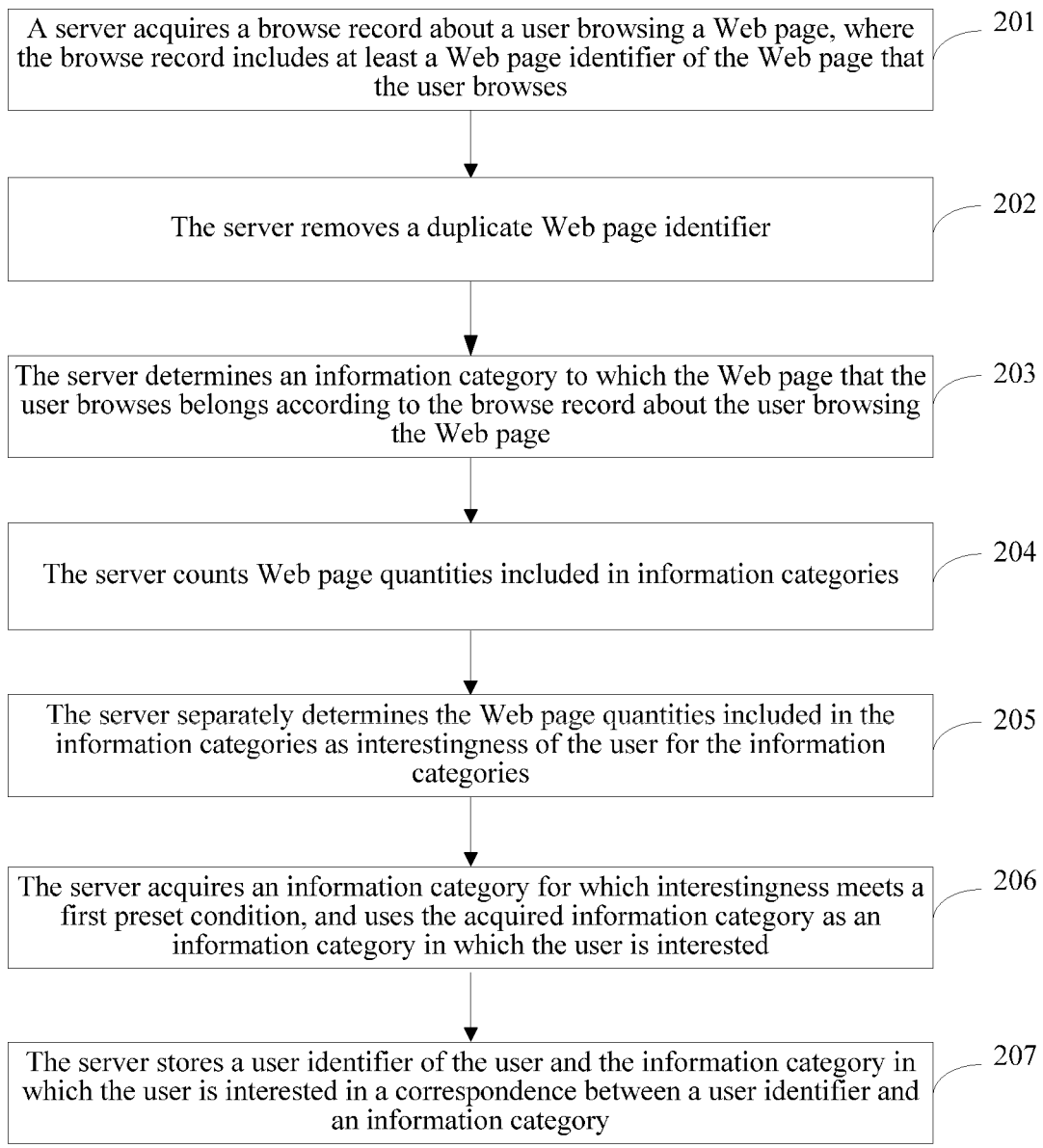
FIG. 2 is a flowchart of an information category acquiring method according to Embodiment 2 of the present invention.

This embodiment of the present invention provides an information category acquiring method. Referring to FIG. 2, the method includes:

Step S201: A server acquires a browse record about a user browsing a Web page, where the browse record includes at least a Web page identifier of the Web page that the user browses.

The Web page identifier may be a uniform resource locator (URL), and the like. The browse record further includes a timestamp about the user browsing the Web page.

A correspondence between a user identifier and a browse record is stored in the server in advance. The server acquires a user identifier of the user, and acquires, according to the user identifier of the user, the browse record about the user browsing the Web page from the correspondence between a user identifier and a browse record.

The browse record further includes the timestamp about the user browsing the Web page, and the server may further acquires, according to the timestamp about the user browsing the Web page, a browse record about the user browsing the Web page within a latest time segment whose duration is a first preset duration.

The first preset duration may be set and changed according to a need, for example, the first preset duration is one month, half a year, or the like. The user identifier of the user is any identifier that can identify the user, for example, the user identifier of the user is a globally unique identifier (GUID) of a terminal corresponding to the user, or the like.

Step S202: The server removes a duplicate Web page identifier.

For same Web page identifiers, the server removes a duplicate Web page identifier, and records a quantity corresponding to the Web page identifiers.

Step S203: The server determines an information category to which the Web page that the user browses belongs according to the browse record about the user browsing the Web page.

The information category is a category to which the Web page that the user browses belongs, for example, the information category is cosmetics, clothes, or the like.

The server acquires, according to the browse record about the user browsing the Web page, the Web page identifier of the Web page that the user browses, and determines the information category to which the Web page that the user browses belongs according to the Web page identifier of the Web page that the user browses.

For each Web page that the user browses, the information category to which the Web page belongs may be determined according to the following steps (1) to (4).

(1) The server acquires a first feature word set corresponding to the Web page according to the Web page identifier of the Web page that the user browses, where the first feature word set is used to store a feature word included in the Web page.

Step (1) may include the following steps (1-1) to (1-3).

(1-1) The server acquires Web page content included in the Web page according to the Web page identifier of the Web page that the user browses.

The Web page content included in the Web page may be a Web page title included in the Web page, a Web page summary included in the Web page, or the like.

Step (1-1) specifically may be that:
the server downloads Web page content corresponding to the Web page identifier from the server according to the Web page identifier of the Web page that the user browses.

(1-2) The server performs word segmentation on the Web page content, to obtain word segments included in the Web page content.

A method for the server to perform word segmentation on the Web page content is any existing word segmentation method. In this embodiment of the present invention, the method of performing word segmentation on the Web page content is not specifically limited.

For example, the Web page content is used as a to-be-segmented word string; and the to-be-segmented word string is segmented by using a method of maximum forward matching, and an ambiguous segment in the to-be-segmented word string during the segmentation by using the method of maximum forward matching is corrected by using a method of a conditional random field, to obtain a result of the word segmentation.

(1-3) The server removes a word segment that meets a first preset part of speech from the word segments included in the Web page content, and uses a remaining word segment as the feature word included in the Web page, to form the first feature word set corresponding to the Web page.

The first preset part of speech includes a modal particle, a stop word, a near-synonym, and the like. The modal particle is any word that indicates a tone, for example, Oh, Hoho, or Hum. The stop word is any word that indicates a stop, for example, of, I, you, or then. The near-synonym is a word with a near meaning. The first feature word set includes at least one feature word.

The server acquires all near-synonym groups in the word segments included in the Web page content, selects one near-synonym from each near-synonym group, removes modal particles, stop words, and near-synonyms other than the selected near-synonyms from the word segments included in the Web page content, and uses remaining word segments as feature words included in the Web page, to form the first feature word set corresponding to the Web page.

It should be noted that, the server acquires a first feature word set corresponding to each Web page included in the browse record of the user according to the foregoing steps (1-1) to (1-3).

(2) The server calculates a matching degree between the first feature word set and each second feature word set in a correspondence between an information category and a second feature word set.

Step (2) may include the following steps (2-1) to (2-3).

(2-1) The server acquires a second feature word set in the correspondence between an information category and a second feature word set.

The correspondence between an information category and a second feature word set is stored in the server in advance. The server acquires each second feature word set in the correspondence between an information category and a second feature word, where the second feature word set includes at least one feature word corresponding to the information category.

(2-2) The server calculates a separate matching degree between each feature word included in the first feature word set and each feature word included in the acquired second feature word set.

A method for the server to calculate a matching degree between a feature word and a feature word is any existing method of calculating the matching degree between a feature word and a feature word. In this embodiment of the present invention, the method of calculating the matching degree between a feature word and a feature word is not specifically limited.

For example, the first feature word set includes feature words A and B, and the second feature word set includes feature words A, C, and D; and the server separately calculates matching degrees between the feature word A and the feature word A, between the feature word A and the feature word C, between the feature word A and the feature word D, between the feature word B and the feature word A, between the feature word B and the feature word C, and between the feature word B and the feature word D.

It should be noted that, in this step, the server separately calculates the separate matching degree between each feature word included in the first feature word set and each feature word included in the second feature word set.

(2-3) The server calculates an average value of a separate matching degree between each feature word included in the first feature word set and each feature word included in the acquired second feature word set, and uses the average value as a matching degree between the first feature word set and the acquired second feature word set.

For example, the server calculates an average value of the matching degrees between the feature word A and the feature word A, between the feature word A and the feature word C, between the feature word A and the feature word D, between the feature word B and the feature word A, between the feature word B and the feature word C, and between the feature word B and the feature word D, uses the obtained average value as a matching degree between the first feature word set and the second feature word set.

In this step, the server may further calculate a probability in the acquired second feature word set, of each feature word included in the first feature word set, use a product of a non-zero probability in the second feature word set, of each feature word, as the matching degree between the first feature word set and the acquired second feature word set.

(3) The server selects a second feature word set whose matching degree with the first feature word set is the maximum.

The server obtains through calculation the matching degree between the first feature word set and each second feature word set, and selects the second feature word set whose matching degree with the first feature word set is the maximum.

(4) The server determines an information category corresponding to the selected second feature word set as the information category to which the Web page belongs.

The correspondence between an information category and a second feature word set is stored in the server in advance; and the server acquires an information category corresponding to the selected second feature word set from the correspondence between an information category and a second feature word set according to the selected second feature word set, and determines the information category as the information category to which the Web page belongs.

The second feature word set corresponding to the information category cannot include all feature words included in the information category. To optimize the second feature word set, in this embodiment of the present invention, the server adds a feature word included in the first feature word set into the selected second feature word set after determining the information category corresponding to the first feature word set.

That the server adds a feature word included in the first feature word set into the selected second feature word set may be that:

the server acquires the feature word included in the first feature word set, acquires a feature word included in the selected second feature word set, finds a feature word with a same meaning and a feature word with a near meaning in the feature word included in the first feature word set and the feature word included the second feature word set, and adds another feature word in the first feature word set other than the feature word with a same meaning and the feature word with a near meaning into the selected second feature word set.

Step S204: The server counts Web page quantities included in information categories.

Step S205: The server separately determines the Web page quantities included in the information categories as interestingness of the user for the information categories.

A larger Web page quantity included in an information category indicates higher interestingness of the user for the information category. Therefore, the server separately determines the Web page quantities included in the information categories as the interestingness of the user for the information categories.

Step S206: The server acquires an information category for which interestingness meets a first preset condition, and uses the acquired information category as an information category in which the user is interested.

The first preset condition may be an information category for which interestingness of the user is greater than a first preset threshold; or the first preset condition is a first preset quantity of information categories for which interestingness of the user is the maximum.

If the first preset condition is that interestingness of the user is greater than the first preset threshold, step S206 may be that:

the server acquires the information category for which interestingness of the user is greater than the first preset threshold, determines the information category for which interestingness of the user is greater than the first preset threshold as the information category for which interestingness of the user meets the first preset condition, and uses the acquired information category as the information category in which the user is interested.

If the first preset condition is the first preset quantity of information categories for which interestingness of the user is the maximum, step S206 may be that:

the server acquires the first preset quantity of information categories for which interestingness of the user is the maximum, determines the first preset quantity of information categories for which interestingness of the user is the maximum as information categories for which interestingness of the user meets the first preset condition, and uses the acquired information categories as information categories in which the user is interested.

The first preset quantity may be set and changed according to a need, for example, the first preset quantity is 3, 5, or the like.

Step S207: The server stores a user identifier of the user and the information category in which the user is interested in a correspondence between a user identifier and an information category.

The server stores the user identifier of the user and the information category in which the user is interested in the correspondence between a user identifier and an information category; and the server may acquire the information category in which the user is interested from the correspondence between a user identifier and an information category according to the user identifier of the user, and recommend information or a product corresponding to the information category in which the user is interested for the user according to the information category in which the user is interested.

In this embodiment of the present invention, a server acquires interestingness of a user for information categories according to a browse record, acquires an information category for which interestingness meets a first preset condition, and uses the acquired information category as an information category in which the user is interested, thereby being capable of improving accuracy for acquiring the information category in which the user is interested.

Embodiment 3

Figure 3:
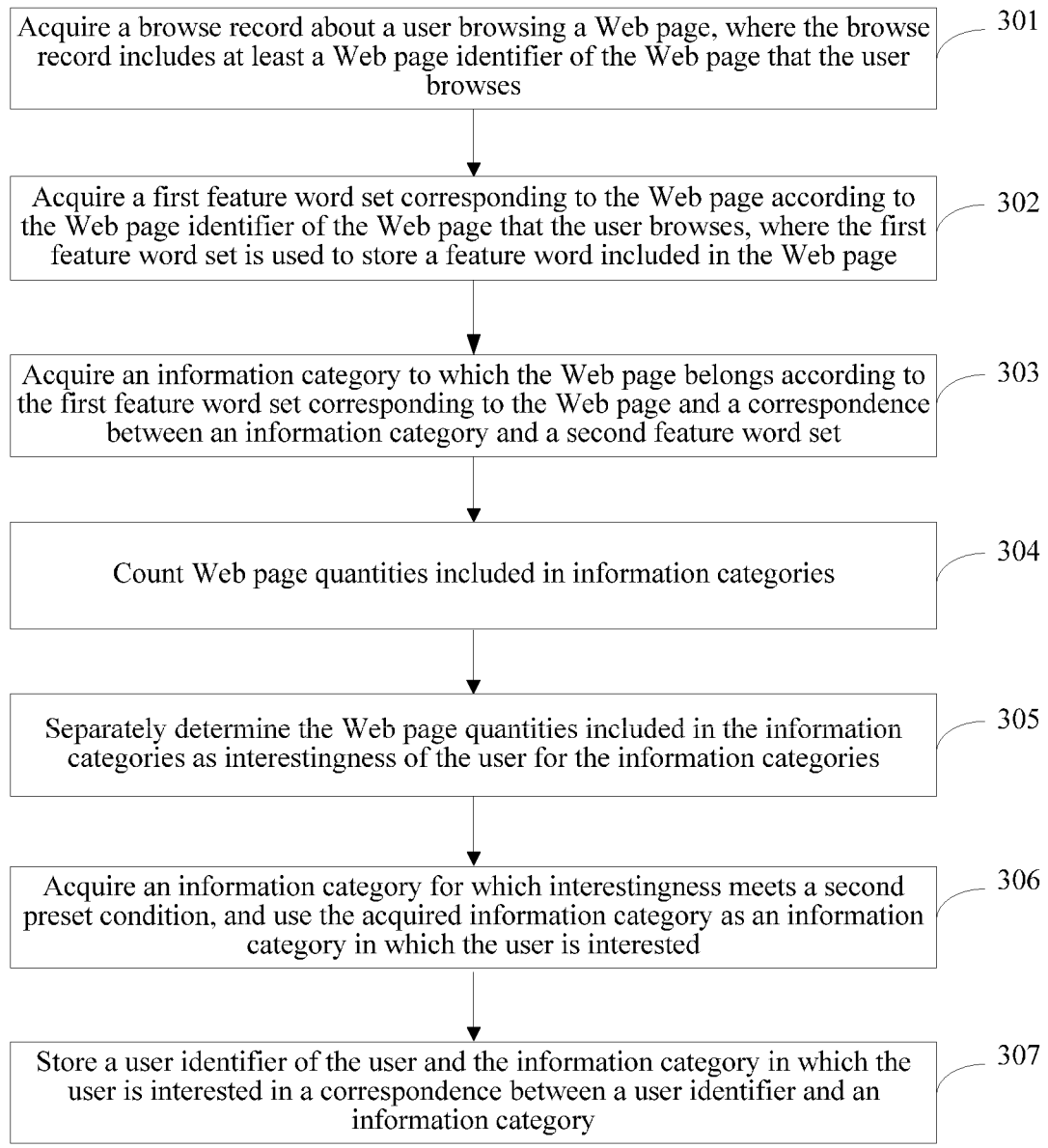
FIG. 3 is a flowchart of an information category acquiring method according to Embodiment 3 of the present invention.

This embodiment of the present invention provides an information category acquiring method. Referring to FIG. 3, the method includes:

Step S301: Acquire a browse record about a user browsing a Web page, where the browse record includes at least a Web page identifier of the Web page that the user browses.

The Web page identifier may be a URL of the Web page, or the like. The browse record further includes a timestamp about the user browsing the Web page.

A correspondence between a user identifier and a browse record is stored in advance. A user identifier of the user is acquired, and the browse record about the user browsing the Web page is acquired from the correspondence between a user identifier and a browse record according to the user identifier of the user.

The browse record further includes the timestamp about the user browsing the Web page, and a browse record about the user browsing the Web page within a latest time segment whose duration is a second preset duration may further be acquired according to the timestamp about the user browsing the Web page.

The second preset duration may be set and changed according to a need, for example, the second preset duration is one month, half a year, or the like. The user identifier of the user is any identifier that can identify the user, for example, the user identifier of the user is a GUID of a terminal corresponding to the user, or the like.

Step S302: Acquire a first feature word set corresponding to the Web page according to the Web page identifier of the Web page that the user browses, where the first feature word set is used to store a feature word included in the Web page.

Before step S302, a duplicate Web page identifier included in the browse record is removed.

For same Web page identifiers, a duplicate Web page identifier is removed, and a quantity corresponding to the Web page identifiers is recorded.

Step S302 may include the following steps (1) to (3):

(1) Acquire Web page content included in the Web page according to the Web page identifier of the Web page that the user browses.

The Web page content included in the Web page may be a Web page title included in the Web page, a Web page summary included in the Web page, or the like.

Step (1) specifically may be:
downloading Web page content corresponding to the Web page identifier from the Web page according to the Web page identifier of the Web page that the user browses.

(2) Perform word segmentation on the Web page content, to obtain word segments included in the Web page content.

A method of performing word segmentation on the Web page content is any existing word segmentation method. In this embodiment of the present invention, the method of performing word segmentation on the Web page content is not specifically limited.

For example, the Web page content is used as a to-be-segmented word string; and the to-be-segmented word string is segmented by using a method of maximum forward matching, and an ambiguous segment in the to-be-segmented word string during the segmentation by using the method of maximum forward matching is corrected by using a method of a conditional random field, to obtain a result of the word segmentation.

(3) Remove a word segment that meets a second preset part of speech from the word segments included in the Web page content, and use a remaining word segment as the feature word included in the Web page, to form the first feature word set corresponding to the Web page.

The second preset part of speech includes a modal particle, a stop word, a near-synonym, and the like. The modal particle is any word that indicates a tone, for example, Oh, Hoho, or Hum. The stop word is any word that indicates a stop, for example, of, I, you, or then. The near-synonym is a word with a near meaning. The first feature word set includes at least one feature word.

All near-synonym groups in the word segments included in the Web page content are acquired, one near-synonym is selected from each near-synonym group, modal particles, stop words, and near-synonyms other than the selected near-synonyms are removed from the word segments included in the Web page content, and remaining word segments are used as feature words included in the Web page, to form the first feature word set corresponding to the Web page.

Step S303: Acquire an information category to which the Web page belongs according to the first feature word set corresponding to the Web page and a correspondence between an information category and a second feature word set.

Step S303 may include the following steps (1) to (3):

(1) Calculate a matching degree between the first feature word set and each second feature word set in a correspondence between an information category and a second feature word set.

Each second feature word set in the correspondence between an information category and a second feature word set is acquired, and the matching degree between the first feature word set and each second feature word set in the correspondence between an information category and a second feature word set is calculated.

The correspondence between an information category and a second feature word set is stored in advance. Each second feature word set in the correspondence between an information category and a second feature word is acquired, where the second feature word set includes at least one feature word corresponding to the information category.

A method of calculating a matching degree between a feature word and a feature word is any existing method of calculating the matching degree between a feature word and a feature word. In this embodiment of the present invention, the method of calculating the matching degree between a feature word and a feature word is not specifically limited.

It should be noted that, in this step, the separate matching degree between each feature word included in the first feature word set and each feature word included in the second feature word set is separately calculated.

(2) Select a second feature word set whose matching degree with the first feature word set is the maximum.

(3) Determine an information category corresponding to the selected second feature word set as the information category to which the Web page belongs.

Step S304: Count Web page quantities included in information categories.

Step S305: Separately determine the Web page quantities included in the information categories as interestingness of the user for the information categories.

A larger Web page quantity included in an information category indicates higher interestingness of the user for the information category. Therefore, the Web page quantities included in the information categories are separately determined as the interestingness of the user for the information categories.

Step S306: Acquire an information category for which interestingness meets a second preset condition, and use the acquired information category as an information category in which the user is interested.

The second preset condition may be an information category for which interestingness of the user is greater than a second preset threshold; or the second preset condition is a second preset quantity of information categories for which interestingness of the user is the maximum.

If the second preset condition is that the interestingness of the user is greater than the second preset threshold, step S306 may be:
acquiring the information category for which interestingness of the user is greater than the second preset threshold, determining the information category for which interestingness of the user is greater than the second preset threshold as the information category for which interestingness of the user meets the second preset condition, and using the acquired information category as the information category in which the user is interested.

If the second preset condition is the second preset quantity of information categories for which interestingness of the user is the maximum, step S306 may be:
acquiring the second preset quantity of information categories for which interestingness of the user is the maximum, determining the second preset quantity of information categories for which interestingness of the user is the maximum as information categories for which interestingness of the user meets the second preset condition, and using the acquired information categories as information categories in which the user is interested.

The second preset quantity may be set and changed according to a need, for example, the second preset quantity is 3, 5, or the like.

Step S307: Store a user identifier of the user and the information category in which the user is interested in a correspondence between a user identifier and an information category.

The user identifier of the user and the information category in which the user is interested is stored in the correspondence between a user identifier and an information category; and the information category in which the user is interested may be acquired from the correspondence between a user identifier and an information category according to the user identifier of the user, and information or a product corresponding to the information category in which the user is interested may be recommended for the user according to the information category in which the user is interested.

In this embodiment of the present invention, a server acquires, according to a Web page identifier of a Web page that a user browses included in a browse record, a first feature word set corresponding to the Web page, acquires an information category to which the Web page belongs according to the first feature word set corresponding to the Web page and a correspondence between an information category and a second feature word set, separately determines Web page quantities included in information categories as interestingness of a user for the information categories, acquires an information category for which interestingness meets a second preset condition, and uses the acquired information category as an information category in which the user is interested, thereby being capable of improving accuracy for acquiring the information category in which the user is interested.

Embodiment 4

Figure 4:
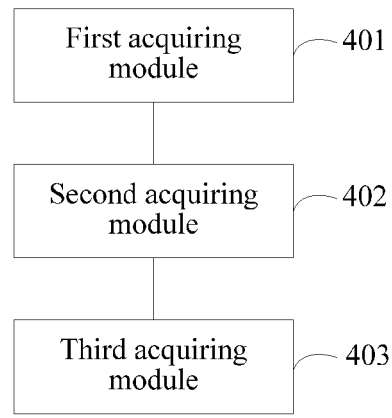
FIG. 4 is a schematic structural diagram of an information category acquiring apparatus according to Embodiment 4 of the present invention.

This embodiment of the present invention provides an information category acquiring apparatus. Referring to FIG. 4, the apparatus includes:
a first acquiring module 401, configured to acquire a browse record about a user browsing a Web page, where the browse record includes at least a Web page identifier of the Web page that the user browses;
a second acquiring module 402, configured to acquire interestingness of the user for information categories according to the browse record; and
a third acquiring module 403, configured to acquire an information category for which interestingness meets a first preset condition, and use the acquired information category as an information category in which the user is interested.

Further, the second acquiring module 402 includes:
a first determining unit, configured to determine an information category to which the Web page that the user browses belongs according to the browse record;
a counting unit, configured to count Web page quantities included in information categories; and
a second determining unit, configured to separately determine the Web page quantities included in the information categories as the interestingness of the user for the information categories.

Further, the first determining unit includes:
an acquiring subunit, configured to acquire a first feature word set corresponding to the Web page according to the Web page identifier of the Web page that the user browses, where the first feature word set is used to store a feature word included in the Web page;
a calculation subunit, configured to calculate a matching degree between the first feature word set and each second feature word set in a correspondence between an information category and a second feature word set;
a selecting subunit, configured to select a second feature word set whose matching degree with the first feature word set is the maximum; and
a determining subunit, configured to determine an information category corresponding to the selected second feature word set as the information category to which the Web page belongs.

Further, the acquiring subunit is configured to acquire Web page content included in the Web page according to the Web page identifier of the Web page that the user browses; perform word segmentation on the Web page content, to obtain word segments included in the Web page content; and remove a word segment that meets a first preset part of speech from the word segments included in the Web page content, and use a remaining word segment as the feature word included in the Web page, to form the first feature word set corresponding to the Web page.

Further, the calculation subunit is configured to acquire a second feature word set in the correspondence between an information category and a second feature word set; calculate a separate matching degree between each feature word included in the first feature word set and each feature word included in the acquired second feature word set; and calculate an average value of a separate matching degree between each feature word included in the first feature word set and each feature word included in the acquired second feature word set, and use the average value as a matching degree between the first feature word set and the acquired second feature word set.

Further, the apparatus further includes:
an adding module, configured to add a feature word included in the first feature word set into the selected second feature word set.

Further, the apparatus further includes:
a first storage module, configured to store a user identifier of the user and the information category in which the user is interested in a correspondence between a user identifier and an information category.

In this embodiment of the present invention, a server acquires interestingness of a user for information categories according to a browse record, acquires an information category for which interestingness meets a first preset condition, and uses the acquired information category as an information category in which the user is interested, thereby being capable of improving accuracy for acquiring the information category in which the user is interested.

Embodiment 5

Figure 5:
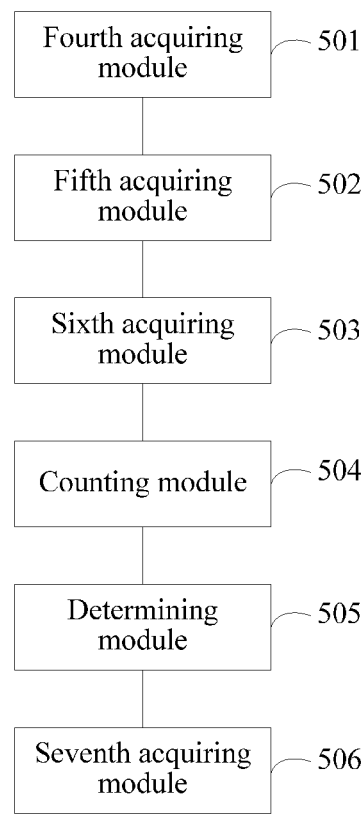
FIG. 5 is a schematic structural diagram of an information category acquiring apparatus according to Embodiment 5 of the present invention.

This embodiment of the present invention provides an information category acquiring apparatus. Referring to FIG. 5, the apparatus includes:
a fourth acquiring module 501, configured to acquire a browse record about a user browsing a Web page, where the browse record includes at least a Web page identifier of the Web page that the user browses;
a fifth acquiring module 502, configured to acquire a first feature word set corresponding to the Web page according to the Web page identifier of the Web page that the user browses, where the first feature word set corresponding to the Web page is used to store a feature word included in the Web page;
a sixth acquiring module 503, configured to acquire an information category to which the Web page belongs according to the first feature word set corresponding to the Web page and a correspondence between an information category and a second feature word set;
a counting module 504, configured to count Web page quantities included in information categories;
a determining module 505, configured to separately determine the Web page quantities included in the information categories as the interestingness of the user for the information categories; and
a seventh acquiring module 506, configured to acquire an information category for which interestingness meets a second preset condition, and use the acquired information category as an information category in which the user is interested.

Further, the apparatus further includes:
a removing module, configured to remove a duplicate Web page identifier included in the browse record.

Further, the sixth acquiring module 503 includes:
a calculation unit, configured to calculate a matching degree between the first feature word set corresponding to the Web page and each second feature word set in the correspondence between an information category and a second feature word set;
a selecting unit, configured to select a second feature word set whose matching degree with the first feature word set is the maximum; and
a third determining unit, configured to determine an information category corresponding to the selected second feature word set as the information category to which the Web page belongs.

Further, the apparatus further includes:
a second storage module, configured to store a user identifier of the user and the information category in which the user is interested in a correspondence between a user identifier and an information category.

In this embodiment of the present invention, a server acquires, according to a Web page identifier of a Web page that a user browses included in a browse record, a first feature word set corresponding to the Web page, acquires an information category to which the Web page belongs according to the first feature word set corresponding to the Web page and a correspondence between an information category and a second feature word set, separately determines Web page quantities included in information categories as interestingness of a user for the information categories, acquires an information category for which interestingness meets a second preset condition, and uses the acquired information category as an information category in which the user is interested, thereby being capable of improving accuracy for acquiring the information category in which the user is interested.

Embodiment 6

Figure 6:
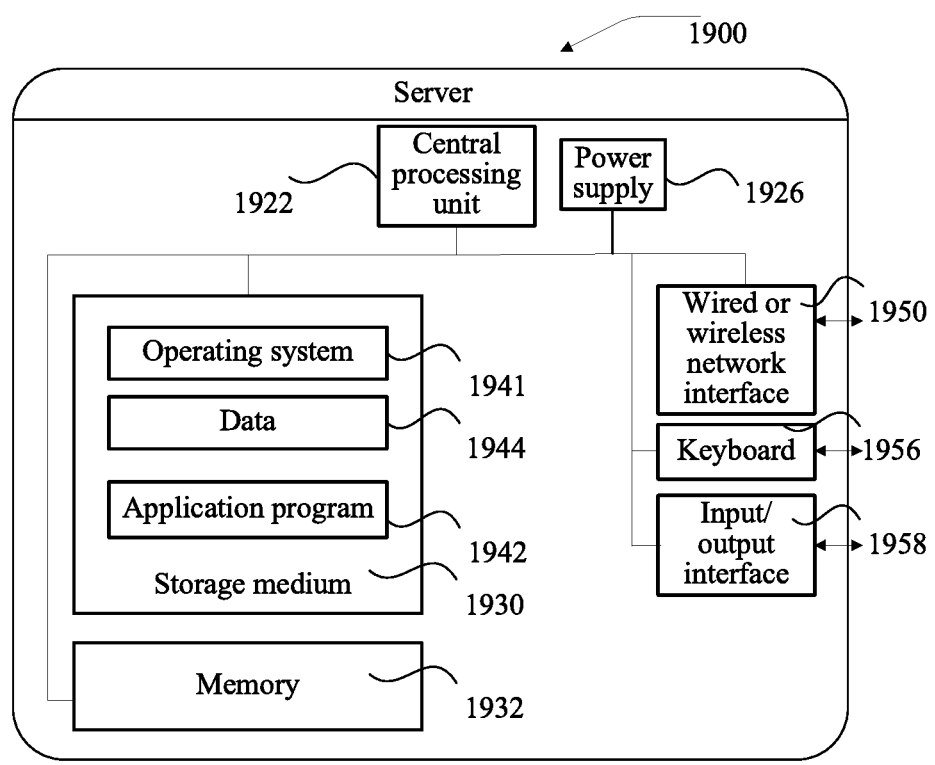
FIG. 6 is an apparatus schematic structural diagram of a server according to Embodiment 6 of the present invention.

FIG. 6 is a schematic structural diagram of a server according to an embodiment of the present invention. The server 1900 may greatly differs due to different configurations and performance, and may include one or more central processing units (CPU) 1922 (for example, one or more processors) and memories 1932, and one or more storage mediums 1930 (for example, one or more massive storage devices) that store application programs 1942 or data 1944. The memories 1932 and the storage mediums 1930 may be used for transient storage or permanent storage. A program stored in the storage medium 1930 may include one or more modules (which are not marked in the figure), and each module may include a series of instruction operations on the server. Further, the CPU 1922 may be set to communicate with the storage medium 1930, and perform, on the server 1900, the series of instruction operations in the storage medium 1930.

The server 1900 may further include one or more power supplies 1926, one or more wired or wireless network interfaces 1950, one or more input/output interfaces 1958, one or more keyboards 1956, and/or, one or more operating systems 1941, for example, Windows Server™, Mac OS X™, Unix™, Linux™, and FreeBSD™.

The server 1900 may include a memory and one or more programs, where the one or more programs are stored in the memory, and are configured, so that the one or more processors execute the one or more programs, including instructions for performing the following operations:
acquiring a browse record about a user browsing a Web page, where the browse record includes at least a Web page identifier of the Web page that the user browses;
acquiring interestingness of the user for information categories according to the browse record; and
acquiring an information category for which interestingness meets a first preset condition, and using the acquired information category as an information category in which the user is interested.

Further, the acquiring interestingness of the user for information categories according to the browse record includes:
determining an information category to which the Web page that the user browses belongs according to the browse record;
counting Web page quantities included in information categories; and
separately determining the Web page quantities included in the information categories as the interestingness of the user for the information categories.

Further, the determining an information category to which the Web page that the user browses belongs according to the browse record includes:
acquiring a first feature word set corresponding to the Web page according to the Web page identifier of the Web page that the user browses, where the first feature word set is used to store a feature word included in the Web page;
calculating a matching degree between the first feature word set and each second feature word set in a correspondence between an information category and a second feature word set;
selecting a second feature word set whose matching degree with the first feature word set is the maximum; and
determining an information category corresponding to the selected second feature word set as the information category to which the Web page belongs.

Further, the acquiring a first feature word set corresponding to the Web page according to the Web page identifier of the Web page that the user browses includes:
acquiring Web page content included in the Web page according to the Web page identifier of the Web page that the user browses;
performing word segmentation on the Web page content, to obtain word segments included in the Web page content; and
removing a word segment that meets a first preset part of speech from the word segments included in the Web page content, and using a remaining word segment as the feature word included in the Web page, to form the first feature word set corresponding to the Web page.

Further, the calculating a matching degree between the first feature word set and each second feature word set in a correspondence between an information category and a second feature word set includes:
acquiring a second feature word set in the correspondence between an information category and a second feature word set;
calculating a separate matching degree between each feature word included in the first feature word set and each feature word included in the acquired second feature word set; and calculating an average value of a separate matching degree between each feature word included in the first feature word set and each feature word included in the acquired second feature word set, and using the average value as a matching degree between the first feature word set and the acquired second feature word set.

Further, the method further includes:

adding a feature word included in the first feature word set into the selected second feature word set.

Further, the method further includes:

storing a user identifier of the user and the information category in which the user is interested in a correspondence between a user identifier and an information category.

In this embodiment of the present invention, a server acquires interestingness of a user for information categories according to a browse record, acquires an information category for which interestingness meets a first preset condition, and uses the acquired information category as an information category in which the user is interested, thereby being capable of improving accuracy for acquiring the information category in which the user is interested.

It should be noted that the foregoing functional modules are only described for exemplary purposes when the information category acquiring apparatus that is provided in the foregoing embodiments acquires an information category. In actual applications, the functions may be allocated to different functional modules according to specific needs, which means that the internal structure of the apparatus is divided to different functional modules to complete all or some of the above described functions. In addition, the information category acquiring apparatus provided in the foregoing embodiments are based on the same concept as the information category acquiring method in the foregoing embodiments. For the specific implementation process, refer to the method embodiments, and the details are not described herein again.

A person of ordinary skill in the art may understand that all or a part of the steps of the embodiments may be implemented by hardware or a program instructing relevant hardware. The program may be stored in a computer readable storage medium. The storage medium may include: a read-only memory, a magnetic disk, or an optical disc.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. An information category acquiring method, the method comprising:

acquiring, by a computing device, a browse record about a user browsing a Web page, the browse record comprising at least a Web page identifier of the Web page that the user browses;

acquiring, by the computing device, a first feature word set corresponding to the Web page according to the Web page identifier of the Web page that the user browses, the first feature word set corresponding to the Web page being used to store a feature word comprised in the Web page;

acquiring, by the computing device, an information category to which the Web page belongs according to the first feature word set corresponding to the Web page and a correspondence between an information category and a second feature word set;

counting, by the computing device, Web page quantities comprised in information categories;

separately determining, by the computing device, the Web page quantities comprised in the information categories as interestingness of the user for the information categories; and acquiring, by the computing device, an information category for which interestingness meets a preset condition, and using the acquired information category as an information category in which the user is interested;

wherein the acquiring the first feature word set corresponding to the Web page according to the Web page identifier of the Web page that the user browses comprises:

acquiring Web page content comprised in the Web page according to the Web page identifier of the Web page that the user browses;

performing word segmentation on the Web page content, to obtain word segments comprised in the Web page content; and removing a word segment that meets a first preset part of speech from the word segments comprised in the Web page content, and using a remaining word segment as the feature word comprised in the Web page, to form the first feature word set corresponding to the Web page, wherein the first preset part of speech comprises a modal particle, a stop word, and a near-synonym;

wherein the acquiring an information category to which the Web page belongs according to the first feature word set corresponding to the Web page and a correspondence between an information category and a second feature word set comprises:

calculating a probability in each second feature word set in the correspondence, of each feature word included in the first feature word set;

using a product of a non-zero probability in the each second feature word set, of the each feature word included in the first feature word set, as a matching degree between the first feature word set corresponding to the Web page and the each second feature word set;

selecting a second feature word set whose matching degree with the first feature word set is the maximum; and determining an information category corresponding to the selected second feature word set as the information category to which the Web page belongs.

2. The method according to claim 1, wherein before the acquiring a first feature word set corresponding to the Web page according to the Web page identifier of the Web page that the user browses, the method further comprises:

removing a duplicate Web page identifier comprised in the browse record.

3. The method according to claim 1, wherein the method further comprises:

storing a user identifier of the user and the information category in which the user is interested in a correspondence between a user identifier and an information category.

4. The method according to claim 1, wherein the method further comprises:

adding a feature word comprised in the first feature word set into the selected second feature word set.

5. An information category acquiring apparatus, the apparatus comprising:

one or more processors;

memory; and a plurality of programs stored in the memory and to be executed by the one or more processors to cause the one or more processors to:

acquire a browse record about a user browsing a Web page, the browse record comprising at least a Web page identifier of the Web page that the user browses;

acquire a first feature word set corresponding to the Web page according to the Web page identifier of the Web page that the user browses, wherein the first feature word set is used to store a feature word comprised in the Web page;

acquire an information category to which the Web page belongs according to the first feature word set corresponding to the Web page and a correspondence between an information category and a second feature word set;

count Web page quantities comprised in information categories;

separately determine the Web page quantities comprised in the information categories as the interestingness of the user for the information categories;

acquire an information category for which interestingness meets a preset condition, and use the acquired information category as an information category in which the user is interested;

wherein the plurality of programs is executed by the one or more processors to cause the one or more processors to:

acquire Web page content comprised in the Web page according to the Web page identifier of the Web page that the user browses;

perform word segmentation on the Web page content, to obtain word segments comprised in the Web page content; and remove a word segment that meets a first preset part of speech from the word segments comprised in the Web page content, and use a remaining word segment as the feature word comprised in the Web page, to form the first feature word set corresponding to the Web page, wherein the first preset part of speech comprises a modal particle, a stop word, and a near-synonym;

wherein the plurality of programs is executed by the one or more processors to cause the one or more processors to:

calculate a probability in each second feature word set in the correspondence, of each feature word included in the first feature word set;

use a product of a non-zero probability in the each second feature word set, of the each feature word included in the first feature word set, as a matching degree between the first feature word set corresponding to the Web page and the each second feature word set;

select a second feature word set whose matching degree with the first feature word set is the maximum; and determine an information category corresponding to the selected second feature word set as the information category to which the Web page belongs.

6. The apparatus according to claim 5, wherein the plurality of programs is executed by the one or more processors to cause the one or more processors to:

add a feature word comprised in the first feature word set into the selected second feature word set.

7. The apparatus according to claim 5, wherein the plurality of programs is executed by the one or more processors to cause the one or more processors to:

store a user identifier of the user and the information category in which the user is interested in a correspondence between a user identifier and an information category.

* * * * *